United States Patent

Matsumoto

(10) Patent No.: US 9,079,527 B2
(45) Date of Patent: Jul. 14, 2015

(54) VEHICLE HEADLAMP

(71) Applicant: KOITO MANUFACTURING CO., LTD., Tokyo (JP)

(72) Inventor: Akinori Matsumoto, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 10 days.

(21) Appl. No.: 14/138,808

(22) Filed: Dec. 23, 2013

(65) Prior Publication Data

US 2014/0177257 A1    Jun. 26, 2014

(30) Foreign Application Priority Data

Dec. 25, 2012 (JP) ................... 2012-280616

(51) Int. Cl.
*F21V 7/00* (2006.01)
*B60Q 1/00* (2006.01)
*B60Q 1/12* (2006.01)
*B60Q 1/20* (2006.01)
*F21S 8/10* (2006.01)

(52) U.S. Cl.
CPC ............ *B60Q 1/0041* (2013.01); *B60Q 1/12* (2013.01); *B60Q 1/20* (2013.01); *F21S 48/1159* (2013.01); *F21S 48/1747* (2013.01)

(58) Field of Classification Search
CPC ............ B60Q 1/004; B60Q 1/20; B60Q 1/12; F21S 48/1159; F21S 48/1747
USPC ........................................ 362/545, 538, 540
See application file for complete search history.

(56) References Cited

U.S. PATENT DOCUMENTS

2008/0144328 A1* 6/2008 Yagi et al. .................... 362/516

FOREIGN PATENT DOCUMENTS

JP        2002-087153 A     3/2002

OTHER PUBLICATIONS

Espacenet Patent Abstract for Japanese Publication No. 2002-087153 (2 pages).

\* cited by examiner

*Primary Examiner* — David V Bruce
(74) *Attorney, Agent, or Firm* — Osha Liang LLP

(57) ABSTRACT

A vehicle headlamp includes at least three lamp units and a controller. Each of the at least three lamp units has a semiconductor light emitting device as a light source. The controller is configured to turn on at least one of the at least three lamp units to form a fog lamp light distribution pattern, and to turn on the at least one of the at least three lamp units and one or more of the at least three lamp units other than the at least one of the at least three lamp units to form a cornering lamp light distribution pattern.

2 Claims, 3 Drawing Sheets

VEHICLE HEADLAMP

CROSS REFERENCE TO RELATED APPLICATION(S)

The present application claims priority from Japanese Patent Application No. 2012-280616 filed on Dec. 25, 2012, the entire content of which is incorporated herein by reference.

FIELD OF INVENTION

The present invention relates to a vehicle headlamp having at least three lamp units, each of the lamp units having a semiconductor light emitting device as a light source.

RELATED ART

A related art vehicle headlamp has a plurality of lamp units, each of the lamp units having its own light distribution characteristics. For example, a related art vehicle cornering lamp has three reflector units, and when turning left at an intersection, the three reflector units are turned on sequentially (see, e.g., JP2002-087153A).

Some vehicles have fog lamps at their front portions in addition to cornering lamps like the one described above. In this instance, separately providing a lamp unit for the fog lamp and a lamp unit for the cornering lamp may use too much space at the front portion of the vehicle, and may increase cost.

SUMMARY

One or more embodiments of the present invention provides a vehicle headlamp having a cornering lamp and a fog lamp that can be implemented in a power saving and space saving manner at low cost.

According to one or more embodiments of the present invention, a vehicle headlamp includes at least three lamp units and a controller. Each of the at least three lamp units has a semiconductor light emitting device as a light source. The controller is configured to turn on at least one of the at least three lamp units to form a fog lamp light distribution pattern, and to turn on the at least one of the at least three lamp units and one or more of the at least three lamp units other than the at least one of the at least three lamp units to form a cornering lamp light distribution pattern.

Other aspects and advantages of the invention will be apparent from the following description, the drawings and the claims.

DETAILED DESCRIPTION

Hereinafter, embodiments of the present invention will be described with reference to the drawings. In embodiments of the invention, specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
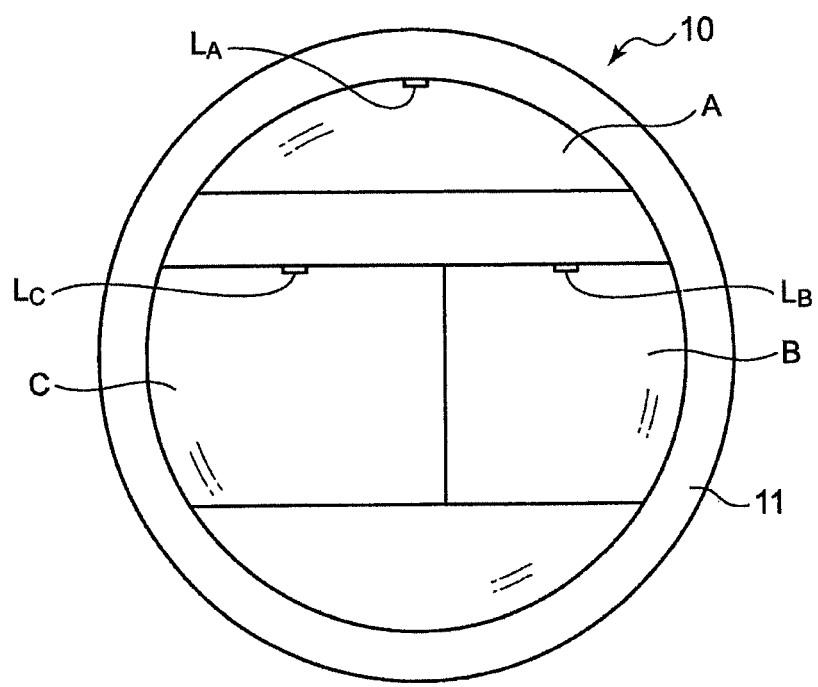
FIG. 1 is a front view of a vehicle headlamp according to one or more embodiments of the present invention.

FIG. 1 is a front view of a vehicle headlamp 10 according to one or more embodiments of the present invention. Headlamps are arranged on right and left in a widthwise direction of the vehicle, and their configurations are substantially bilaterally symmetric. Therefore, the headlamp 10 to be arranged on a right side of a vehicle will be described below as a representative example.

The vehicle headlamp 10 has three lamp units A, B, C, each having a semiconductor light emitting device $L_A$, $L_B$, $L_C$, such as a light emitting diode (LED), as a light source. These lamp units are housed inside a single circular lamp body 11. The front side of the lamp body 11 is covered by a single outer cover. In the example shown in FIG. 1, the first lamp unit A is arranged at an upper part of the lamp body 11, and the second lamp unit B and the third lamp unit C are arranged in an area extending below a center of the housing. However, the lamp units may be arranged in a different manner.

Figure 2:
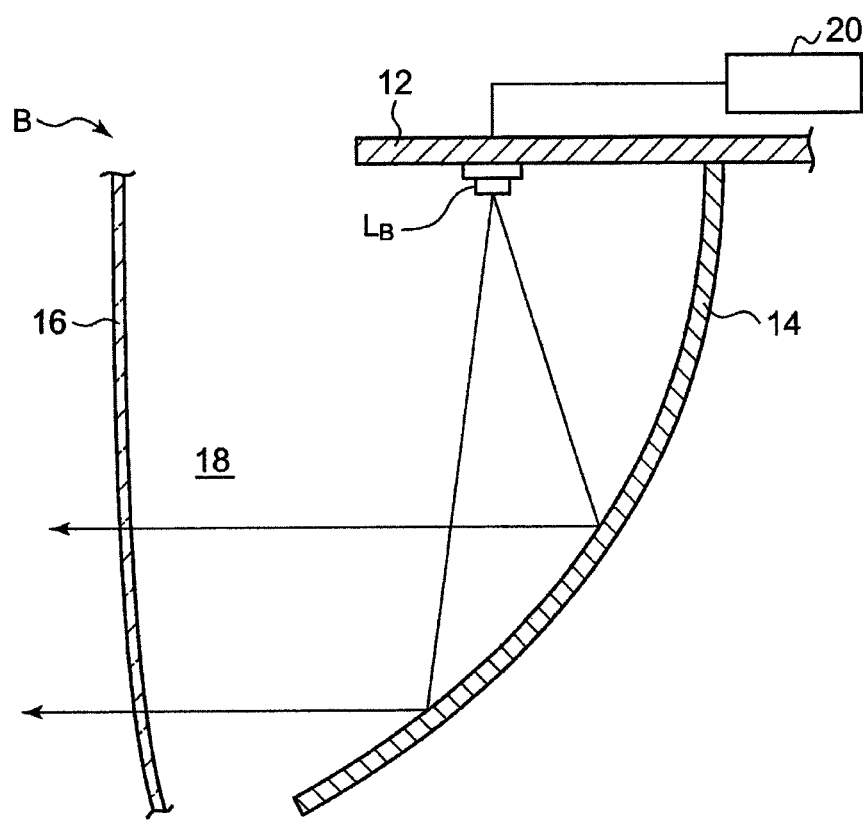
FIG. 2 is a sectional view of a second lamp unit if the vehicle headlamp, taken along a vertical plane including an optical axis.

FIG. 2 is a sectional view of the second lamp unit B, taken along a vertical plane including an optical axis. The second lamp unit B has a lamp chamber 18 formed by a lamp body having an opening portion on a front side of the vehicle (left side in FIG. 2) and an outer cover 16 made of transparent resin, covering the opening portion of the lamp body. A reflector 14 is formed by a free curved surface based on a paraboloidal surface, and has such a shape that the surface is cut by a plane including a focal point of the paraboloidal surface. A light emitting device $L_B$ is arranged to be positioned at or near the focal point of the paraboloidal surface. The reflector 14 and the light emitting device $L_B$ are fixed to a support member 12. The light emitted by the light emitting device $L_B$ is reflected by the reflector 14, and is projected forward from the vehicle through the outer cover 16 as substantially parallel light rays.

A controller 20 includes, for example, a control circuit or a microcontroller, and is configured to control turning on and off of the light emitting devices $L_A$, $L_B$, $L_C$ of the three lamp units A, B, C.

The vehicle headlamp 10 is configured to function as a cornering lamp and also as a fog lamp. In response to an instruction from a driver or a vehicle control unit, the controller 20 turns on different combinations of lamp units depending on whether it is the cornering lamp or the fog lamp that being instructed, so as to form corresponding light distribution patterns.

The first lamp unit A and the third lamp unit C may basically have a same configuration as the second lamp unit B. One or more of the three lamp units may be configured as a projector-type lamp unit having a reflecting surface based on an ellipsoidal surface.

Figure 3:
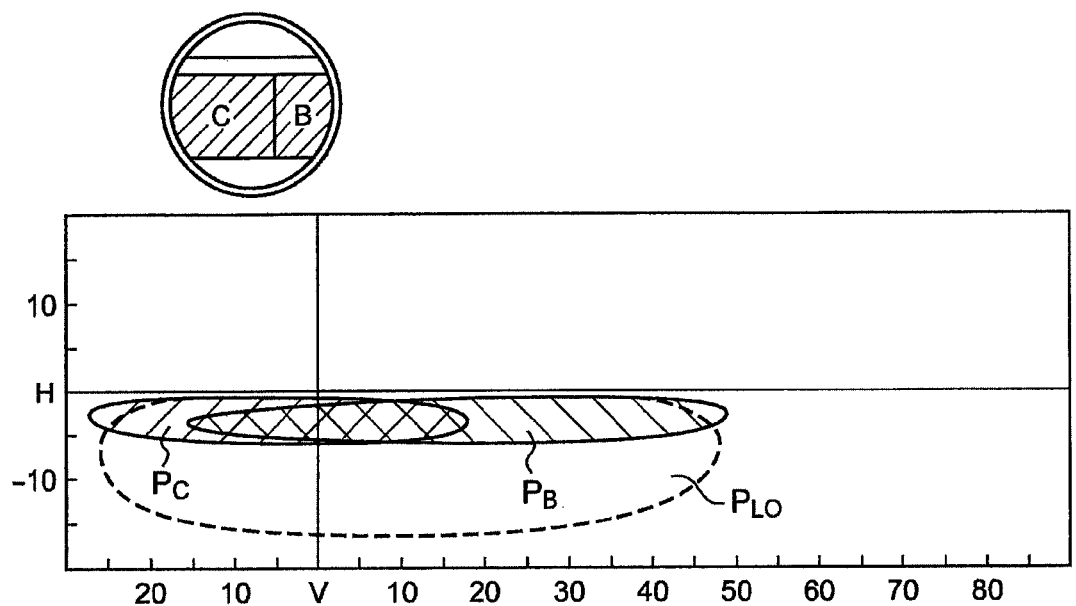
FIG. 3 is a diagram illustrating an example of a fog lamp light distribution pattern that is formed when the vehicle headlamp is used as a fog lamp.
Figure 4:
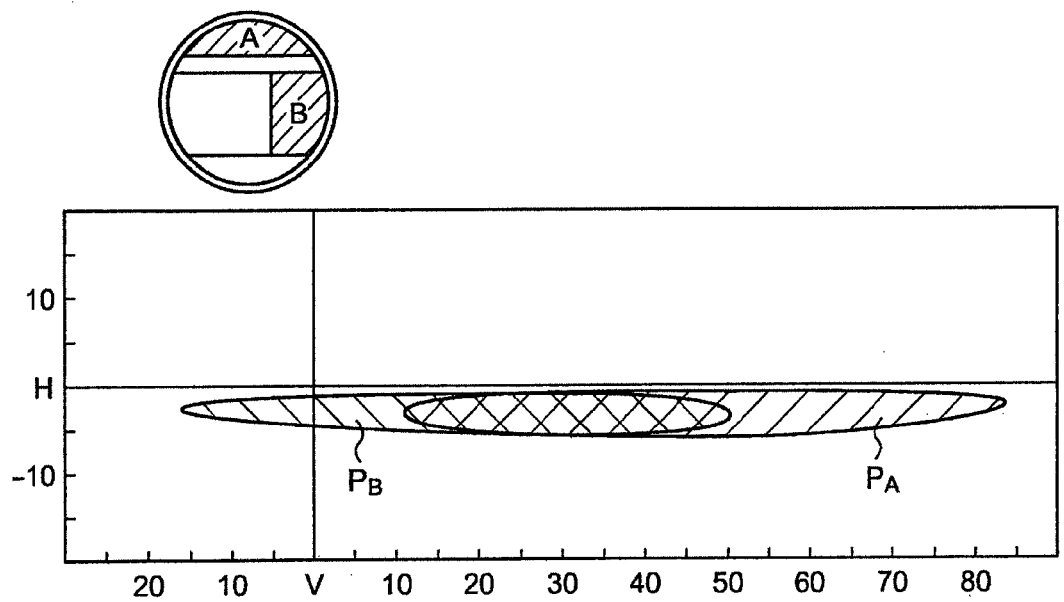
FIG. 4 is a diagram illustrating an example of a cornering lamp light distribution pattern that is formed when the vehicle headlamp is used as a cornering lamp.

According to one or more embodiments of the present invention, the reflector of the first lamp unit A is configured to form a main optical axis zone and a diffused portion (largely diffused portion) of the cornering lamp light distribution pattern (see $P_A$ in FIG. 4). The reflector of the second lamp unit B is configured to form a diffused portion of the fog lamp light distribution pattern (see $P_B$ in FIG. 3) and a portion of a cornering lamp light distribution pattern (see $P_B$ in FIG. 4). The reflector of the third lamp unit C is configured to form a hot zone of a fog lamp light distribution pattern in a forward direction (see $P_C$ in FIG. 3). The diffused portion of the cornering lamp light distribution pattern (see $P_A$ in FIG. 4) is diffused more laterally than the diffused portion of the fog lamp light distribution pattern (see $P_B$ in FIG. 3).

FIG. 3 illustrates an example of the fog lamp light distribution pattern that is formed when the vehicle headlamp 10 is used as a fog lamp. In this example, the controller 20 turns on the light emitting devices $L_B$, $L_C$ of the second lamp unit B and the third lamp unit C. Accordingly, a light distribution pattern is formed to intensify a portion of a low beam light distribution pattern $P_{LO}$ near the horizontal line. The low beam light distribution pattern $P_{LO}$ is formed by a different lamp unit.

FIG. 4 illustrates an example of the cornering lamp light distribution pattern that is formed when the vehicle headlamp 10 is used as a cornering lamp. In this example, the controller 20 turns on the light emitting devices $L_A$, $L_B$ of the first lamp unit A and the second lamp unit B. Accordingly, a light distribution pattern that meets the requirement of a cornering lamp defined by regulation, i.e., irradiating a range of 45°±15° from the vehicle center on the right and left, can be obtained.

As described above, according to one or more embodiments of the present invention, a vehicle headlamp has three lamp units, and the second lamp unit is turned on when forming the fog lamp light distribution pattern and also when forming the cornering lamp light distribution pattern. By providing a lamp unit that is used for both the fog lamp and the cornering lamp, the number of semiconductor light emitting devices is reduced, and it is possible to achieve power saving and space saving at low cost, as compared with a configuration in which the fog lamp and the cornering lamp are separately provided.

While the invention has been described with respect to a certain embodiment, those skilled in the art, having benefit of this disclosure, will appreciate that other embodiments can be devised which do not depart from the scope of the invention as disclosed herein. Accordingly, the scope of the invention should be limited only by the attached claims.

The combination of the lamp units is not limited to the combinations described above. The number of lamp units may be four or more, and three or more lamp units may be combined. The fog lamp or the cornering lamp may use only one of the lamp units. For example, five lamp units may be arranged inside a single lamp body, three of the lamp units may be combined to form a fog lamp light distribution patter, and a different combination of three of the lamp units may be used to form a cornering lamp light distribution pattern.

What is claimed is:

1. A vehicle headlamp comprising;
    at least three lamp units, each of the at least three lamp units having a semiconductor light emitting device as a light source; and
    a controller configured to turn on at least one of the at least three lamp units to form a fog lamp light distribution pattern, and to turn on the at least one of the at least three lamp units and one or more of the at least three lamp units other than the at least one of the at least three lamp units to form a cornering lamp light distribution pattern.

2. The vehicle headlamp according to claim 1, wherein the at least three lamp units comprise:
    a first lamp unit configured to form a diffused portion of the cornering lamp light distribution pattern;
    a second lamp unit configured to form a diffused portion of the fog lamp light distribution pattern and a portion of the cornering lamp light distribution pattern; and
    a third lamp unit configured to form a hot zone of the fog lamp light distribution pattern in a forward direction,
    wherein the diffused portion of the cornering lamp light distribution pattern is diffused more laterally than the diffused portion of the fog lamp light distribution pattern, and
    wherein the controller turns on the second lamp unit to form the fog lamp light distribution pattern and also to form the cornering lamp light distribution pattern.

\* \* \* \* \*